(12) United States Patent
Frohlund

(10) Patent No.: US 6,321,415 B1
(45) Date of Patent: Nov. 27, 2001

(54) ARRANGEMENT AT A MOBILE TELEPHONE

(75) Inventor: Stig Frohlund, Hässleholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/265,864

(22) Filed: Mar. 11, 1999

(30) Foreign Application Priority Data

Mar. 24, 1998 (SE) .................................................. 9800071

(51) Int. Cl.[7] .............................. E05F 1/08; E05D 11/10
(52) U.S. Cl. .................. 16/330; 16/303; 16/285; 379/433
(58) Field of Search ..................... 16/303, 330, 304, 16/285; 379/433

(56) References Cited

U.S. PATENT DOCUMENTS

| | | |
|---|---|---|
| 5,628,089 | 5/1997 | Wilcox et al. . |
| 5,636,275 | 6/1997 | Takagi et al. . |
| 5,649,309 | 7/1997 | Wilcox et al. . |
| 5,764,760 | 6/1998 | Grandbert et al. . |
| 5,905,796 * | 5/1999 | Jung ........................ 379/433 |
| 5,915,440 * | 6/1999 | Repo ........................ 16/341 |
| 5,937,062 * | 8/1999 | Sun et al. ................. 16/330 |
| 5,987,122 * | 11/1999 | Daffara et al. ........... 379/433 |
| 5,996,178 * | 12/1999 | Murray ..................... 16/303 |
| 6,065,187 * | 5/2000 | Mischenko ................ 16/303 |
| 6,070,298 * | 6/2000 | Sorimachi ................. 16/330 |
| 6,115,886 * | 9/2000 | Fujita ....................... 16/330 |
| 6,122,801 * | 9/2000 | Reichert et al. .......... 16/303 |
| 6,141,831 * | 11/2000 | Novin et al. ............. 16/330 |

FOREIGN PATENT DOCUMENTS

| | | |
|---|---|---|
| 0 422 882 | 4/1991 | (EP) . |
| 0 777 370 | 6/1997 | (EP) . |

* cited by examiner

*Primary Examiner*—Chuck Y. Mah
(74) *Attorney, Agent, or Firm*—Burns, Doane, Swecker & Mathis, L.L.P.

(57) ABSTRACT

An arrangement is provided in connection with a cellular mobile telephone, having a protective hatch or flip pivotably arranged on a housing of the telephone. The flip is pivotable around an axle and is arranged to be able to physically cover at least parts of a keypad on the telephone. The axle includes passive hinges at its one end for establishing a physical pivotable connection along an axis of pivot for the flip, and an active hinge arrangement at its other end for positively urging the flip to occupy at least one predetermined position. The active hinge arrangement is arranged in a substantially closed compartment or cavity at one end of the housing and is formed from a shaft and a combined torsion/pressure spring arranged thereon. The spring has at its respective ends, fingers acting as counteracting parts of a torsion spring for positively urging the flip from a closed and locked position covering the keypad, to an open use position at approximately 120°–170° from the closed position after release of the lock. The spring also includes press surfaces affected by a cam follower arrangement, thereby obtaining a non-destructive override function for the flip.

4 Claims, 3 Drawing Sheets

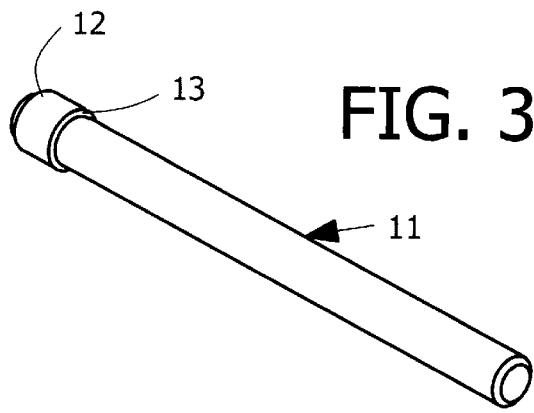
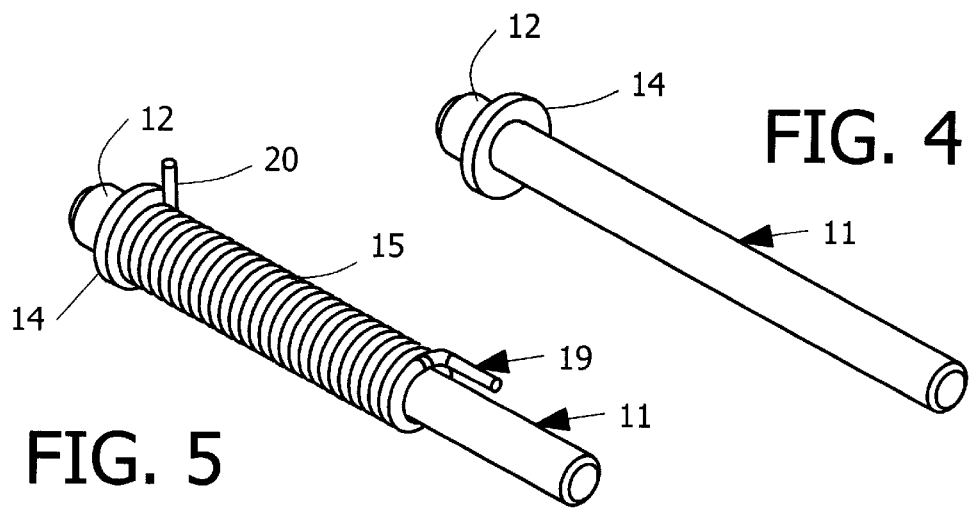
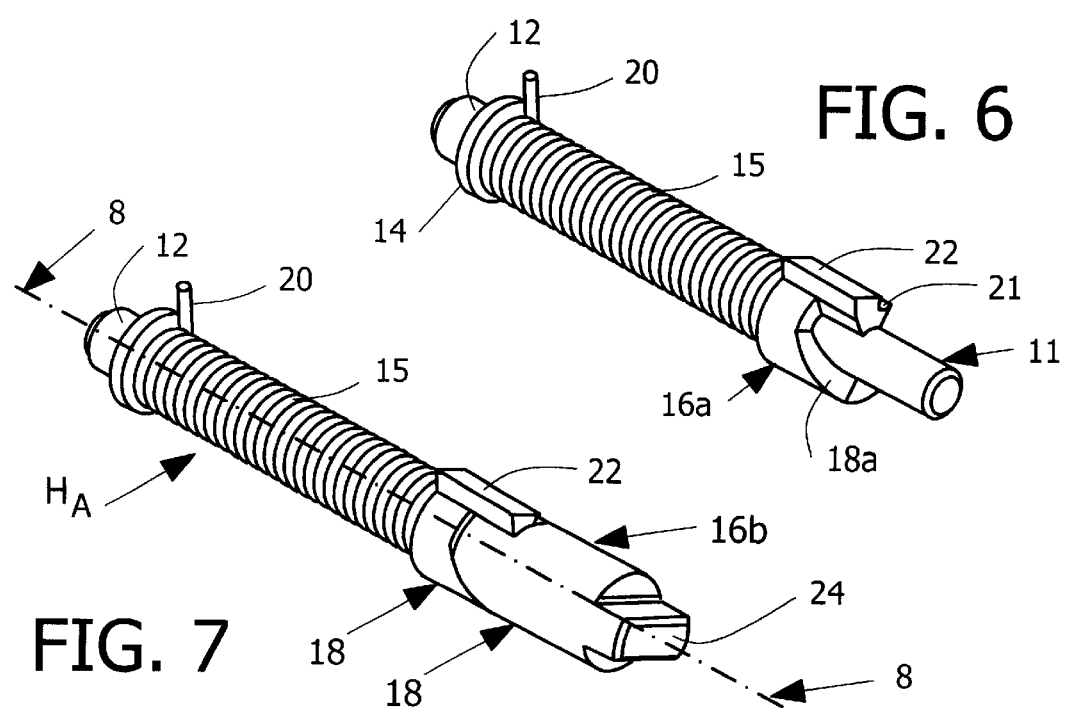

ARRANGEMENT AT A MOBILE TELEPHONE

This application claims priority under 35 U.S.C. §119 and/or 365 to 9800071-5 filed in Sweden on Mar. 24, 1998; the entire content of which is hereby incorporated by reference.

The present invention relates to an arrangement in connection with a cellular mobile telephone apparatus, comprising a protective hatch or flip pivotably arranged on a housing of said apparatus, said flip being pivotable around an axle and arranged to physically cover at least parts of a keypad on said apparatus, whereby said axle comprises passive hinge means at one end for establishing a physical pivotable connection along an axis of pivot for the flip, and active hinge means at its other end for positively affecting said flip to occupy at least one certain predetermined position.

Mobile telephones provided with such a flip or a hatch, for covering a key pad thereon, have been used by certain manufacturers for some years. The main purpose with such a flip—being to protect said keypad from inadvertent manipulation—has been tackled electronically by other manufacturers through the use of key pad locks, being initiated by inserting a certain code for using the keypad.

Mobile telephones have now become so small that such a flip must be used for establishing the right distance between the earpiece and a sound receiving means, namely a sound channel leading to a microphone or the microphone itself. For obtaining the best possible fidelity of the sound registered by said microphone, it should preferably be placed in said flip.

It is for practical reasons desired that the flip on such a small mobile telephone should be made positively openable by for instance pressing a button on the side of the mobile telephone and thereafter be kept in a certain angular use-position. For geometrical reasons this can not be achieved by a conventional cam follower mechanism in the hinge means, frequently used until now.

Such cam followers, like for instance according to U.S. Pat. No. 5,628,089, comprise a compression spring, which biasses the cam follower mechanism to keep the flip in either a closed position, covering the keypad, or an open position revealing the same, while at the same time establishing a suitable speaking position (use-position). With such a cam follower it is not possible to both establish the positions of the flip mentioned above and achieve an override function. An override function is a function enabling the flip in its open position to be turned beyond this use-position, being about 160° separated from the closed position, up to maybe 180°, when e.g. laid upside down on a table and pushed down unintentionally.

SUMMARY

It is therefore an object of the present invention to provide a mobile telephone apparatus with improved means for positively opening such a flip, and at the same time achieving an override function as described above.

To meet this object said active hinge means in said arrangement is arranged in a substantially closed compartment at one end of said housing and is constituted from a shaft and a combined torsion/pressure spring arranged thereon, having at its respective ends, fingers acting as counteracting parts of a torsion spring for positively urging the flip from a closed position covering the keypad to an open use position at 120°–170° from said closed position, and also constituted from press surfaces affected by a cam curve or follower arrangement to obtain a non-destructive override function for the flip.

By this arrangement the axial force of said spring is enclosed in the arrangement and will therefore not affect the flip in any other way than giving it a positive urge towards a use position. This gives the advantage that it eliminates the risk for fatigue cracking of the outer parts of the flip due to a constant tension from said spring.

BRIEF DESCRIPTION OF THE DRAWINGS

A preferred embodiment of the invention will be described in more detail below under reference to the enclosed drawings, in which, FIGS. 3 to 7 are enlarged perspective views showing said active hinge means in consecutively more and more completely assembled condition.

DETAILED DESCRIPTION

Figure 1:
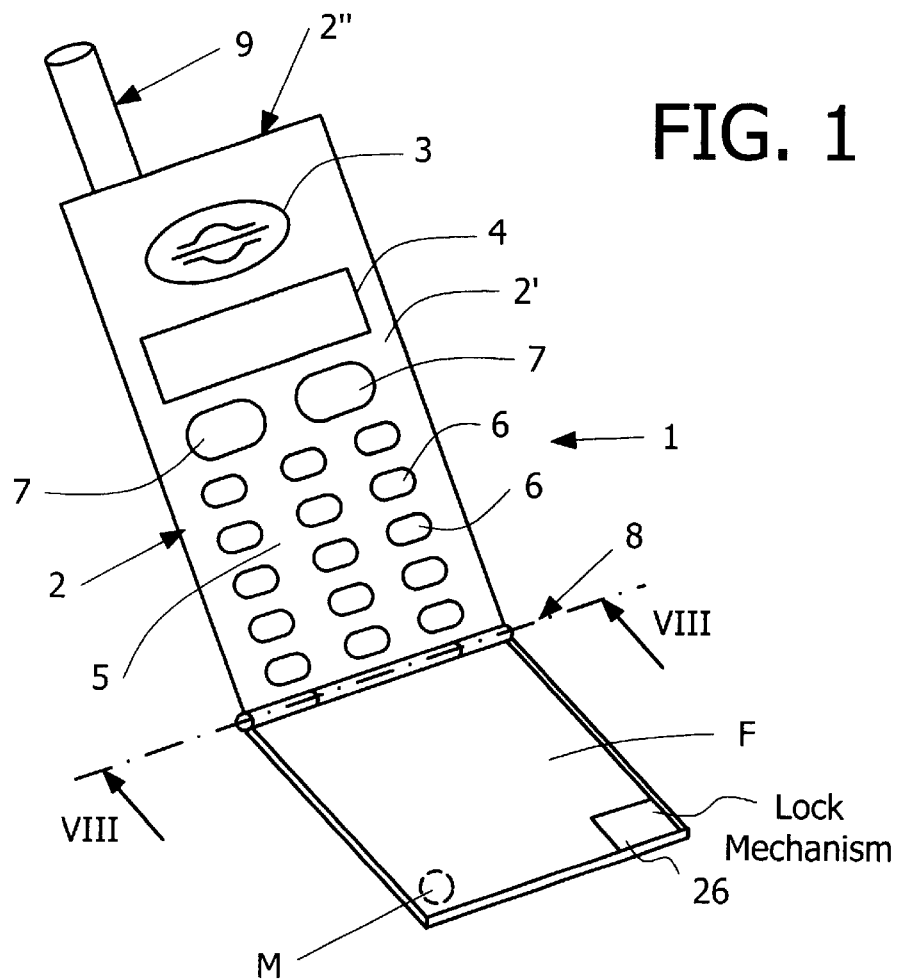
FIG. 1 is a general perspective view of a mobile telephone saving a flip for protecting its keypad.

FIG. 1 shows a conventional "flip type" mobile telephone apparatus 1 including a housing 2, which at its front side 2' has an earpiece 3, a display 4, a keypad 5 with conventional buttons 6 for dialling and functional buttons 7, such as "on/off", "send", "clear", etc., and on a top side 2" of the housing 2 an antenna 9. In particular, FIG. 1 shows a flip F, arranged on an axle 8 of the kind that the present invention relates to. The flip F has a microphone M active and passive hinge means.

Figure 2:
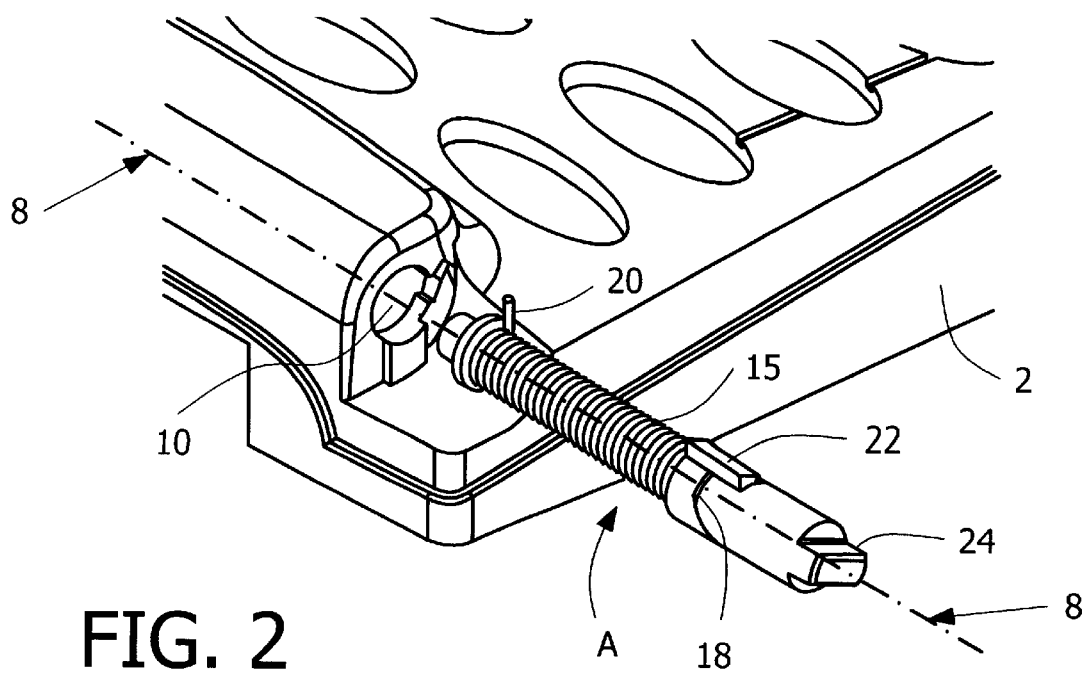
FIG. 2 is an enlarged partial view of a cellular mobile telephone apparatus with its whole active hinge means arranged and shown outside a substantially closed cavity in which it is to be permanently arranged.
Figure 8:
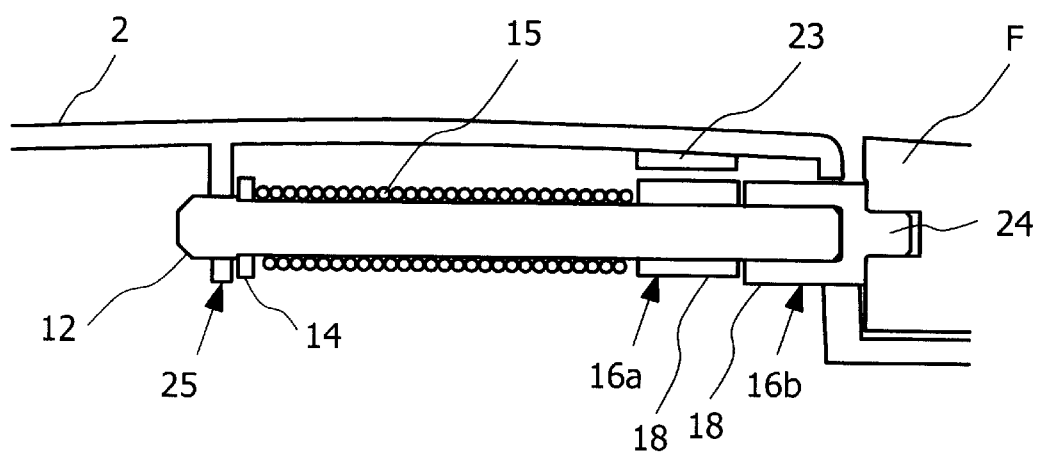
FIG. 8 is a section along VIII—VIII in FIG. 1 showing said active hinge means in an assembled condition.

In FIG. 2 being a partial perspective view, an arrangement A according to the invention is shown in its assembled but not mounted condition. Along the length of said axle 8, active hinge means $H_A$ is arranged (see FIGS. 2 and 7) as well as passive such means (not shown), for example constituted by a protrusion on the housing 2, which co-operates with a recess in the flip F. The arrangement A is shown situated in the vicinity of its mounting place, i.e. a substantially closed cavity 10 specially designed for this purpose. The embodiment shown has this cavity arranged in the lower right hand corner of the housing 2. As shown the opening to said cavity is specially designed to permit the introduction and fixation of the arrangement therein. The introduction and fixation operation thereof will be further described below.

For obtaining a better understanding of the invention the details of the arrangement according to the invention are in the following described under reference to a sequence of consecutively arranged illustrations, namely FIGS. 3–8, in which the arrangement A is successively constructed starting from a shaft 11 (FIG. 3), having a cylindrical part or bearing surface 12 at its innermost end. This part 12 defines an axial shoulder 13, which constitutes a support surface for an axially loaded washer 14,(see FIG. 4). Said load is accomplished by a spring 15 (see FIG. 5) which for this purpose acts as a compression spring. (The said spring is in all Figs shown without a requisite compression play. This play should at least be equal to the compression achievable by a cam curve mechanism 18). The spring 15 is, however, constructed so as to act both as such a compression spring and as a torsion spring. This latter function becomes clearer from FIGS. 6 and 7. As shown in FIG. 6 a first part 16a of a cam curve mechanism 18 is rotatably arranged the shaft 11. Apart from a curve 18a thereon, the part 16a includes fixation means 21 for a finger 19, axially protruding from the spring 15. Adjacent to said fixation means 21 is a knob 22 for cooperation (see below) with a corresponding part 23 (see FIG. 8) in the cavity 10 of the housing 2. Finally, an end member or second part 16b of the above mentioned cam curve mechanism 18 is fixedly arranged for example by press fit on the outer end of the shaft 11. The end member has at its extreme outer end a driving dog 24 to, by the engagement of the driving dog 24 with a recess in the flip F, positively urge the flip F towards its open position, when the arrangement A is mounted.

For mounting the arrangement in the cavity 10 of the housing 2, the arrangement A, now fully assembled, is brought to a position shown in FIG. 2. It appears therein that the opening to the cavity is designed to fully correspond to the arrangement A during the introduction thereof. The end with the bearing surface 12 and the washer 14 is first introduced into the cavity 10 and is brought into a position corresponding to between 30% and 50% of the length of the spring 15. In this position the arrangement is turned clockwise until a finger 20, radially protruding from the spring 15, meets with an abutment (not shown) in the cavity 10. The arrangement A and its spring is thereafter biased another 360° ($\geq$360°) and is thereafter introduced further into the cavity 10 until the washer 14 contacts a corresponding part 25. The arrangement is thereafter torsionally released, whereby the knob 22 contacts a part or an abutment 23 in the cavity 10 (schematically shown in FIG. 8) to keep the torsional bias of the spring 15 at a level approximately corresponding to the above mentioned 360°. The spring 15 now has the ability to function both as a compression spring, acted upon by the cam curve mechanism 18 during an override of the flip (between 120–180°) from its open position, and as a torsion spring to positively urge the flip F towards an active position (between 120–170° from its closed position), aimed for a telephone conversation. The flip F is thereafter with ease applied between the active and passive ends defining the pivot axle 8 of the flip F. As is obvious the flip also comprises a manually operated lock mechanism for keeping the flip F in a closed position, which mechanism here is neither shown nor described since this is well known in the technical field and can be realized in many ways.

What is claimed is:

1. Arrangement in a cellular mobile telephone apparatus, comprising a protective hatch or flip pivotably arranged on a housing of said apparatus, said flip being pivotable around an axle and arranged to physically cover at least parts of a keypad on said apparatus, said axle comprising passive hinge means at a first end for establishing a physical pivotable connection along an axis of pivot for the flip and active hinge means at a second end opposite the first end of the axle for positively affecting said flip to occupy at least one certain predetermined position, wherein said active hinge means is arranged in a substantially closed cavity at one end of said housing and is formed from a shaft and a combined torsion/compression spring arranged thereon, the combined spring having at respective first and second ends corresponding first and second fingers acting as counteracting parts of the torsion spring for positively urging the flip to pivot from a closed position covering the at least parts of the keypad to an open use position at approximately 120°–170° from said closed position, said spring also having press surfaces at the first and second spring ends to be affected by a cam follower arrangement coupled to one of the fingers for achieving a non-destructive override function for the flip.

2. Arrangement according to claim 1, wherein said override function is of the spring back type such that the cam follower arrangement, when activated, by an override force, further axially compresses the compression spring beyond a non-axially compressed position, consequently reurging the flip to the open use position after release of the override force.

3. Arrangement according to claim 2, wherein said use position is located at approximately 160°±5° from the closed position of said flip.

4. Arrangement according to claim 1, further comprising a lock mechanism holding the flip in a closed position against the torsional force from the spring.

* * * * *